Sept. 10, 1968   N. C. JACKSON   3,401,075
CHANNEL SHAPED STRIP STRUCTURE
Filed July 14, 1965
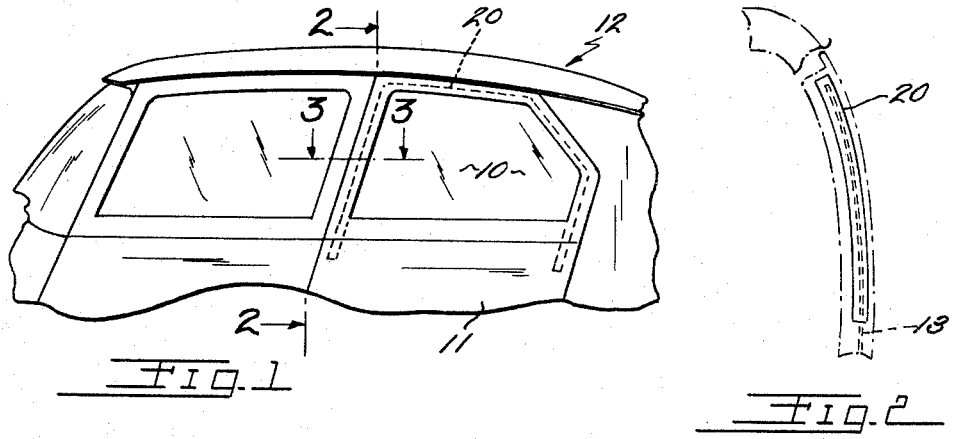
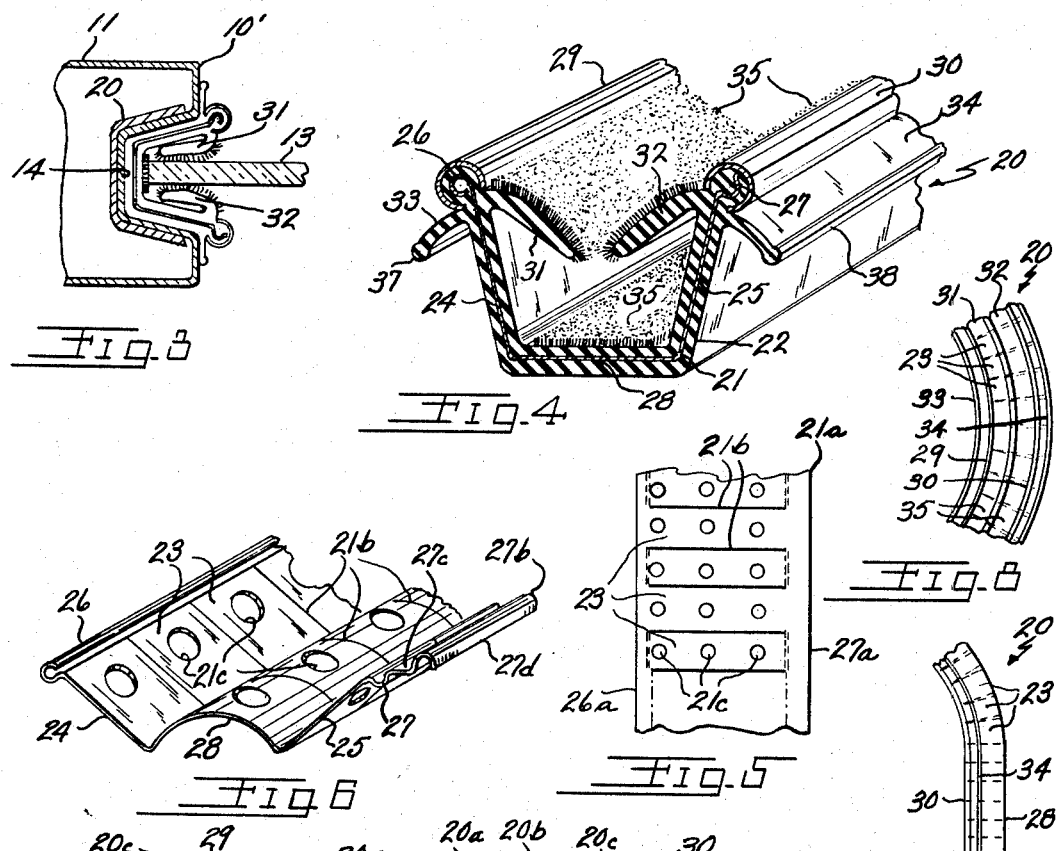
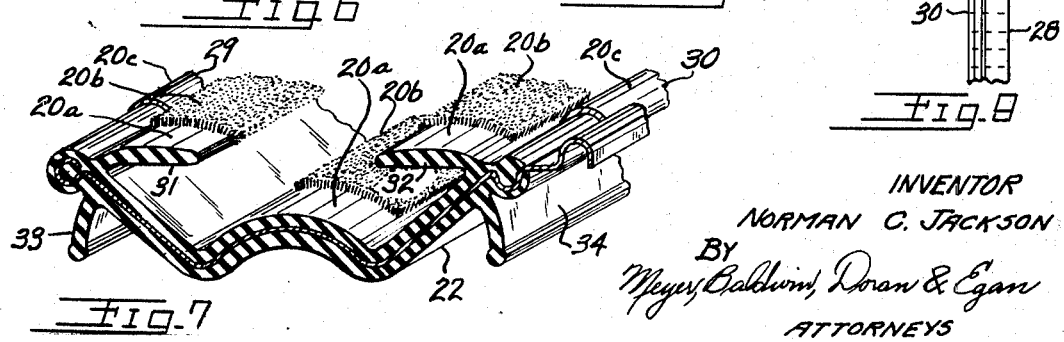
INVENTOR
NORMAN C. JACKSON
BY
Meyer, Baldwin, Doran & Egan
ATTORNEYS United States Patent Office 3,401,075
Patented Sept. 10, 1968

3,401,075
CHANNEL SHAPED STRIP STRUCTURE
Norman C. Jackson, Sheffield Lake Village, Ohio, assignor to The Standard Products Company, Cleveland, Ohio, a corporation of Ohio
Filed July 14, 1965, Ser. No. 471,913
5 Claims. (Cl. 161—64)

ABSTRACT OF THE DISCLOSURE

A channel shaped strip structure having a core with a resilient cover thereover. The core is divided into a plurality of transverse elements connected to each other only along one edge so the strip can be bent or formed in two right angularly disposed planes. The strip cover is provided with resilient sealing lips projecting outwardly from the channel and resilient flocked fins projecting inwardly toward the center of the channel.

DISCLOSURE

This invention relates generally to strip structures and more particularly to a window channel for use in an automobile to provide seating means and a glass run for the windows. The invention is further directed to a method of manufacturing the window channel.

The invention has for its primary object the provision of an article of the aforesaid nature which is characterized by its structural simplicity, its inexpensive manufacturing cost, the attractive forms in which it may be made, and the particularly effective manner in which it performs its function.

More specifically, it is an object of this invention to provide a window channel which can be bent or formed in two right-angularly disposed planes to both fit the contour of an automobile door and accommodate a curved window glass.

Another object is to provide such a window channel having a core of relatively rigid sheet material, such as sheet metal, said core comprising transversely disposed, channel-shaped elements connected to each other only along one edge of one flange of the channel.

Still another object of the invention is to provide a window channel as set forth above wherein the core is provided with a cover of resilient material.

Yet another object is to provide a window channel having the above features and characteristics wherein the resilient cover is provided with resilient sealing lips projecting outwardly from the flanges of the channel, and resilient, flocked fins projecting inwardly from the flanges toward the center of the channel.

Further objects of the present invention and a number of its advantages will be referred to in or will be evident from the following description of one embodiment of the invention. Reference is made throughout the description to the accompanying drawings illustrating the invention.

FIG. 1 of the drawings shows a part of an automobile including two side windows thereof.

FIG. 2 is a view of the window channel of this invention taken along the line 2—2 of FIG. 1, the automobile body and door being shown in broken lines.

FIG. 3 is an enlarged, detailed section taken along the line 3—3 of FIG. 1.

FIG. 4 is a further enlarged end perspective view of the window channel of this invention in its final form.

FIG. 5 is a plan view of a strip of sheet metal from which the core of the window channel is made showing a first step in the method of manufacture of the window channel.

FIG. 6 is an end perspective view of the core showing a subsequent step in the manufacture of the window channel.

FIG. 7 is an end perspective view of the core and cover showing still more subsequent steps in the manufacture of the window channel.

FIG. 8 is a fragmentary detail showing the window channel bent or formed in one plane.

FIG. 9 is a fragmentary detail showing the window channel bent or formed in a plane disposed at right angles to the plane of the bend in FIG. 8.

Before the article illustrated is specifically described, it is to be understood that the invention here involved is not limited to the structural details or arrangement of parts shown since window channels embodying the present invention may take various forms. It is also to be understood that the phraseology or terminology herein employed is for the purpose of description and not of limitation since the scope of the present invention is denoted by the appended claims.

Referring now to the drawings, FIG. 1 shows a typical installation of the window channel of this invention, said channel being installed around a window 10 of a rear door 11 at one side of an automobile 12. It will be understood that this particular installation is given by way of example only and that the window channel of this invention is adaptable to windows of various shapes and for use in the installation of both curved and straight windows at any place in the vehicle where it is desired that the window be openable. As shown in FIG. 1, the window channel shown in dotted line at 20 is adapted to conform to the irregularly shaped window 10 and is capable of accommodating both sharp and shallow bends about axes disposed within the window area. The window channel is installed with the open side of the channel opening inwardly toward the window 10 whereby it provides glass runs for the side edges of the windows and seating means for the upper edge of the window.

FIG. 2 illustrates the manner in which the window channel 20 can be formed to accommodate a curved window glass 13. Curved window glass is increasingly used in modern automobile designs, and the window channel of the present invention is particularly well adapted for mounting such curved glass.

Referring now to FIG. 4, the window channel 20 is provided in strip form and has a structure comprising a shaped metal core 21 and a resilient cover 22 made of rubber or similar resilient material. Said core comprises a plurality of transversely disposed, channel-shaped, relatively narrow elements or ribs 23 (FIG. 6) which, in the final form of the channel, are connected together only along the upper edge of one flange 24 of said core. The opposite flange of the core, shown at 25, comprises disconnected element portions as will become hereinlater apparent. The upper edge of the flange 24 is rolled to provide a bead 26 thereby affording a moderate amount of rigidity and stiffness to one edge of the window channel 20. The edge of the opposite flange 25 comprising disconnected element portions is provided with a U-shaped bend as indicated at 27.

The cover 22 in the form herein illustrated is extruded upon the core 21 and completely encases the flanges 24, 25 and a web 28 which connects the bottoms of said flanges. The bead 26 and the U-shaped bend 27 are also substantially encased by the cover 22 and are then provided with decorative outer beads 29 and 30, respectively.

Immediately below the outer beads 29 and 30, there are provided inwardly and downwardly directed lips 31 and 32, respectively, and outwardly and downwardly directed lips 33 and 34, respectively. The inner lips 31 and 32 are of substantial thickness and are provided with flocking 35 on the upper surfaces thereof. Flocking 35 is also provided in the bottom of the window channel 20 above the web 28. The outwardly directed lips 33 and 34 are relatively thinner than the inner lips and are provided at their outer edges with integrally formed beads 37 and 38, respectively.

FIG. 3 shows the manner in which the window channel 20 is seated within a recess 14 in an edge 10' of the door 11, which said edge defines the window 10. The window channel 20 is secured within the recess 14 in any suitable manner and is seated therein with the lips 33 and 34 extending outwardly and being resiliently biased against the edge 10' of the window frame. The window glass 13 is wedged in between the inner lips 31 and 32 with the flocking 35 thereof bearing against the surfaces of said window glass. The edge of said window glass is disposed adjacent to the flocking 35 which is provided in the bottom of the window channel whereby the glass at all times contacts only said flocking. At the sides of the window 10, the glass moves parallel with the lengthwise dimension of the window channel 20 which said window channel serves as a way or run for the glass. The upper edge of said glass seats within the portion of the window channel 20 which runs across the top of the window 10 when said window is rolled upwardly to the closed position. The outer lips 33 and 34 provide a weather seal between the window channel 20 and the recess 14, and the flocking 35 provides an effective weather seal for the window glass 13.

FIGS. 5–7 and FIG. 4 illustrate steps in the method of manufacturing the window channel 20. Referring specifically to FIG. 5, the method includes the step of providing a narrow strip 21a of sheet metal with the narrow transverse elements or ribs 23 by slitting said strip transversely at uniformly spaced intervals as indicated at 21b. It will be noted that the slits 21b terminate short of the side edges of the strip 21a, said slits extending closer to one side edge 26a than to the opposite side edge 27a. The strip 21a may also be provided with transverse rows of apertures 21c, one row of said apertures being provided in each rib 23.

FIG. 6 illustrates a preforming step in which the strip 21a is given a semichannel form wherein the web 28 and the flanges 24 and 25 are initially formed. At this time, the unslitted portion adjacent to the side edge 26a is rolled to form the bead 26 of the flange 24. The somewhat larger unslitted portion adjacent to the side edge 27a is provided with the U-shaped bend 27 plus a carrier 27b which comprises a lateral extension 27c terminating at its outer edge in an inverted U-shaped portion 27d. It will be noted that at this point in the construction of the core 21, the transverse ribs 23 are connected adjacent to both edges of said core.

FIG. 7 illustrates subsequent steps in the manufacture of the window channel 20. Beginning at the front end of the strip structure fragment as illustrated, the preformed strip or core of FIG. 6 is next provided with a cover, this step being indicated at 20a. In the form as herein illustrated, the cover is extruded rubber which said rubber is vulcanized during this step.

The flocking 35 is then added, this step being indicated at 20b. The flocking 35 may be applied in any suitable manner, one method being to first provide the desired surface with a suitable adhesive and then applying the flocking in a controlled, electrostatic field. Apparatus of the type used in electrostatic flocking is fully disclosed in assignee's United States Patent No. 2,811,134 entitled Apparatus for Preventing Flock Build-up on a Flocking Machine Electrode.

A still more subsequent step in the construction of the window channel 20 is indicated at 20c wherein the carrier 27b is sheared off adjacent to the U-shaped bend 27, and the beads 29 and 30 are applied.

The final step in the construction of the window channel 20 is illustrated in FIG. 4 where it is finish formed to the desired U-shape whereby it will fit snugly and closely within a recess such as that shown at 14 in FIG. 3.

FIGS. 8 and 9 illustrate the manner in which the window channel 20 of this invention is readily formable or bendable in two planes disposed at right angles to each other. FIG. 8 is a plan view of said window channel looking into the open side thereof. As hereinbefore explained, the ribs 23 are connected together only by the bead 26 encased by the outer bead 29. The opposite ends of said ribs are disconnected because the unslitted portion of the strip 21a adjacent to the side edge 27a comprised the carrier 27b, and this carrier has been sheared off. The slits 21b are of such length as to extend through the U-shaped bend 27 and into the lateral extension 27c (FIG. 6) whereby when the carrier 27b is removed, all of the elements or ribs 23 are disconnected at the flange 25. Therefore, the window channel 20 can be bent or curved in a lateral plane around a center disposed laterally outwardly of the strip adjacent to the flange 24, the elements or ribs 23 separating within the resilient cover 22 at the opposite side of the strip. The outer bead 30 will at this time slip relative to the covering material surrounding the U-shaped bend 27 thereby allowing the above described bending of the channel. When bent in this direction as illustrated in FIG. 8, the window channel of this invention is adapted for use as a glass run for curved glass windows.

FIG. 9 is a side plan view of the window channel 20 showing the manner in which said channel may be formed about axes disposed transverse and adjacent to the open side of said channel. The elements or ribs 23 are, of course, completely separated throughout most of the flange 24, across the bottom web 28, and throughout all of the flange 25. In a bend as illustrated in FIG. 9, therefore, the ribs 23 simply separate at the bottom of the window channel to the extent needed to effect the desired bend. The resilient nature of the cover 22 allows sufficient elongation of the bottom of the channel to accommodate such bends. The feature of being bendable in the manner illustrated in FIG. 9 enables the window channel 20 to conform to the inner contour of a window 10 in the manner illustrated in FIG. 1.

It will be understood that many changes in the details of the invention as herein described and illustrated may be made without, however, departing from the spirit thereof or the scope of the appended claims.

What is claimed is:

1. A channel shaped strip structure comprising a core of strip sheet metal formed to a U-shape in transverse section; said core being provided with a plurality of transverse, spaced slits defining therebetween a plurality of transverse, U-shaped ribs; said slits extending from one edge across said strip and adjacent to the other said edge with said ribs thereby being integrally connected to each other only along said other edge; and a resilient cover encasing said core whereby said strip structure is capable of being bent in two right angularly disposed planes.

2. A channel shaped strip structure comprising a core of U-shaped elements connected to each other only along one side edge of said strip structure; a resilient cover encasing said core; a rolled bead of sheet material engaging the edges of said covered elements along each side of said strip structure; generally inwardly projecting lips extending inwardly from said cover below said beads; and flocking disposed on the upper surfaces of said lips and on the upper surface of the bottom of said channel.

3. A channel shaped strip structure comprising a core of U-shaped elements connected to each other only along one side edge of said strip structure; a resilient cover encasing said core; a rolled bead of sheet material engaging the edges of said core along each side of said strip structure; generally inwardly projecting lips extending inwardly from said cover below said beads; generally outwardly projecting lips extending outwardly from said cover below said beads; and flocking disposed on the upper surfaces of said inwardly projecting lips and on the upper surface of the bottom of said channel.

4. A channel shaped strip structure comprising a strip of sheet metal formed to a U-shape in transverse section and having a central web and upstanding flanges at the sides of said web; said strip having a plurality of transverse, spaced slits defining therebetween a plurality of transverse, U-shaped ribs; said slits extending from one edge across said strip and adjacent to the other edge with said ribs thereby being integrally connected to each other only along said other edge; resilient cover encasing said core; generally inwardly projecting lips extending inwardly from said cover adjacent to said flanges and spaced above the bottom of the channel defined by said strip; and flocking disposed on the upper surfaces of said lips and on the upper surface of the bottom of said channel.

5. A channel shaped strip structure comprising a strip of sheet metal formed to a U-shape in transverse section and having a central web and upstanding flanges at the sides of said web; said strip having a plurality of transverse, spaced slits defining therebetween a plurality of transverse, U-shaped ribs; said slits extending from one edge across said strip and adjacent to the other said edge with said ribs thereby being integrally connected to each other only along said other edge; a resilient cover encasing said core; a rolled bead of sheet metal engaging the edges of said ribs at the top of said flanges along each side of said strip structure; generally inwardly projecting lips extending inwardly from said cover below said bead and spaced above the bottom of the channel defined by said strip; generally outwardly projecting lips extending outwardly from said cover below said bead; and flocking disposed on the upper surfaces of said inwardly projecting lips and on the upper surface of the bottom of said channel.

References Cited

UNITED STATES PATENTS

| | | | |
|---|---|---|---|
| 1,918,666 | 7/1933 | Reid | 161—101 XR |
| 3,067,455 | 12/1962 | Reid. | |
| 3,222,769 | 12/1965 | Le Plae | 52—716 XR |
| 3,290,826 | 12/1966 | Weimar | 49—440 |
| 3,310,928 | 3/1967 | Weimar | 52—716 |
| 3,333,364 | 8/1967 | Herr | 49—441 |

ROBERT F. BURNETT, *Primary Examiner.*

R. H. CRISS, *Assistant Examiner.*